United States Patent
Ko et al.

(10) Patent No.: US 8,660,001 B2
(45) Date of Patent: Feb. 25, 2014

(54) METHOD AND APPARATUS FOR PROVIDING PER-SUBSCRIBER-AWARE-FLOW QOS

(75) Inventors: Nam-Seok Ko, Daejeon-si (KR); Jong-Dae Park, Daejeon-si (KR); Byung-Ho Yae, Daejeon-si (KR); Sung-Kee Noh, Daejeon-si (KR); Woo-Sug Jung, Daejeon-si (KR); Sung-Jin Moon, Daejeon-si (KR); Hwan-Jo Heo, Daejeon-si (KR); Soon-Seok Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 166 days.

(21) Appl. No.: 13/299,618

(22) Filed: Nov. 18, 2011

(65) Prior Publication Data

US 2012/0127858 A1    May 24, 2012

(30) Foreign Application Priority Data

Nov. 24, 2010   (KR) .......................... 10-2010-0117409

(51) Int. Cl.
*H04L 12/26* (2006.01)

(52) U.S. Cl.
USPC ........................................................ 370/232

(58) Field of Classification Search
None
See application file for complete search history.

(56) References Cited

U.S. PATENT DOCUMENTS

| | | | |
|---|---|---|---|
| 6,574,195 B2 | 6/2003 | Roberts | |
| 7,126,918 B2 | 10/2006 | Roberts | |
| 2003/0123392 A1* | 7/2003 | Ruutu et al. | 370/235 |
| 2003/0128667 A1* | 7/2003 | Matsufuru | 370/230.1 |
| 2004/0100967 A1* | 5/2004 | Robotham et al. | 370/395.4 |
| 2004/0131057 A1 | 7/2004 | Miyashita | |
| 2004/0205004 A1* | 10/2004 | Bahl et al. | 705/26 |
| 2005/0153697 A1* | 7/2005 | Patel | 455/442 |
| 2005/0276219 A1* | 12/2005 | Wang et al. | 370/229 |
| 2006/0120393 A1* | 6/2006 | Lee et al. | 370/412 |
| 2006/0153199 A1* | 7/2006 | Lee et al. | 370/395.4 |
| 2007/0115825 A1 | 5/2007 | Roberts | |
| 2009/0316578 A1* | 12/2009 | Mang et al. | 370/230 |

FOREIGN PATENT DOCUMENTS

| | | |
|---|---|---|
| KR | 10-0369562 | 1/2003 |
| KR | 10-0563874 | 3/2006 |

* cited by examiner

*Primary Examiner* — Otis L Thompson, Jr.
(74) *Attorney, Agent, or Firm* — Staas & Halsey LLP

(57) ABSTRACT

A packet scheduling apparatus and method to fairly share network bandwidth between multiple subscribers and to fairly share the bandwidth allocated to each subscriber between multiple flows are provided. The packet scheduling method includes calculating first bandwidth for each subscriber to fairly share total bandwidth set for the transmission of packets between multiple subscribers; calculating second bandwidth for each flow to fairly share the first bandwidth between one or more flows that belong to each of the multiple subscribers; and scheduling a packet of each of the one or more flows based on the second bandwidth.

8 Claims, 6 Drawing Sheets

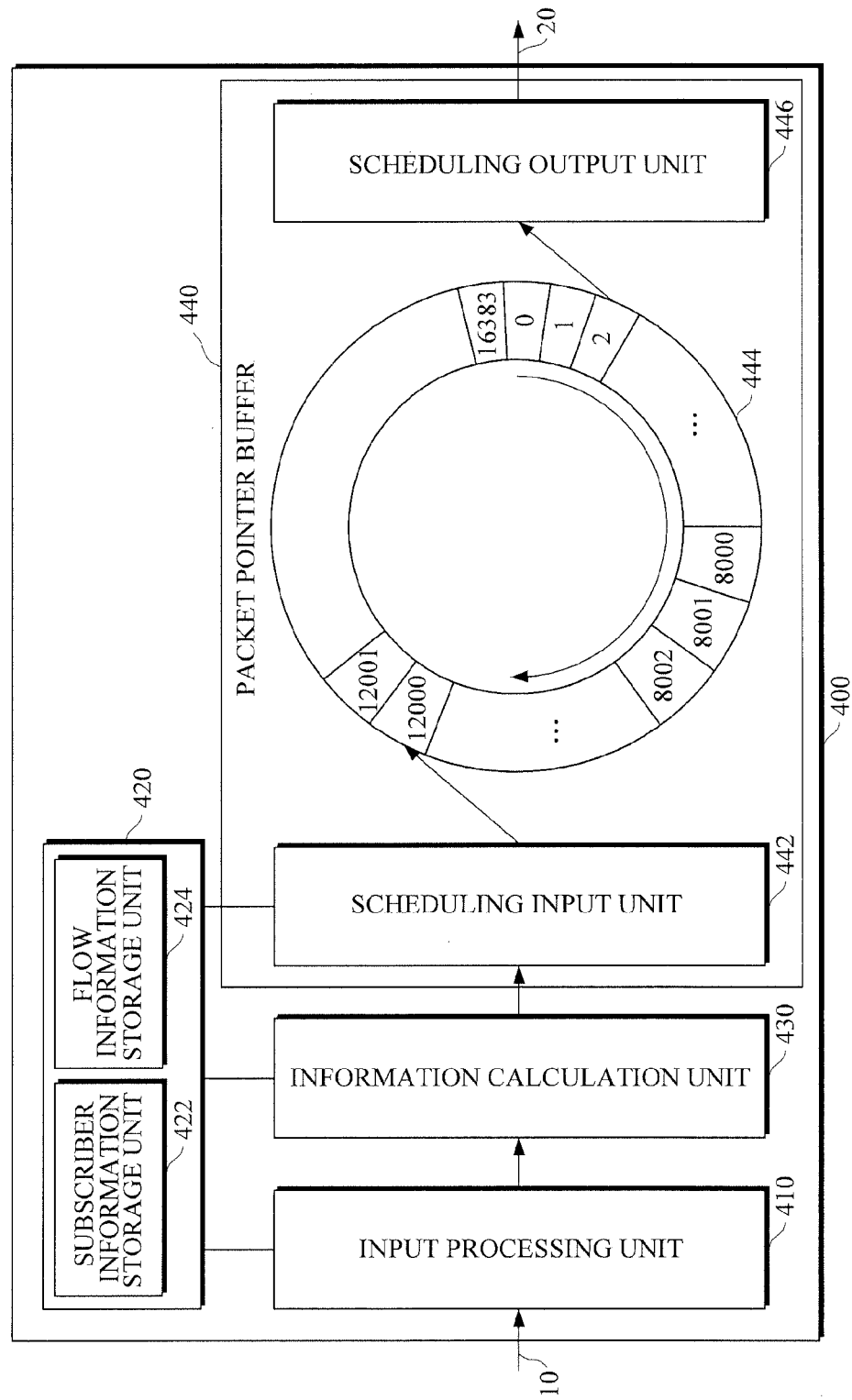

METHOD AND APPARATUS FOR PROVIDING PER-SUBSCRIBER-AWARE-FLOW QOS

CROSS-REFERENCE TO RELATED APPLICATION(S)

This application claims the benefit under 35 U.S.C. §119(a) of Korean Patent Application No. 10-2010-0117409, filed on Nov. 24, 2010, in the Korean Intellectual Property Office, the entire disclosure of which is incorporated herein by reference for all purposes.

BACKGROUND

1. Field

The following description relates to a method of effectively sharing network bandwidth between traffic flows generated by multiple users.

2. Description of the Related Art

There are various methods available to provide per-traffic flow or per-class Quality of Service (QoS) in a network device, such as a packet scheduling method, a buffer management method, and the like. To provide QoS for each application session, a method has been suggested, in which packets are classified into traffic flows and QoS is provided for each of the traffic flows. These methods, however, simply provide QoS for each flow regardless of the distribution of subscribers in each traffic, and may thus cause subscribers that generate a large amount of traffic to use much more network bandwidth than subscribers that generate only a small amount of traffic.

SUMMARY

The following description relates to an apparatus and method for providing per-subscriber-aware-flow Quality of Service (QoS), in which network bandwidth can be fairly distributed between subscribers while preventing the subscribers from using more than their fair share of network bandwidth, and in which packets can be effectively scheduled while allowing the subscribers to use only their fair share of network bandwidth.

In one general aspect, there is provided a packet scheduling method, including: calculating first bandwidth for each subscriber to fairly share total bandwidth set for the transmission of packets between multiple subscribers; calculating second bandwidth for each flow to fairly share the first bandwidth between one or more flows that belong to each of the multiple subscribers; and scheduling a packet of each of the one or more flows based on the second bandwidth.

In another general aspect, there is provided a packet scheduling apparatus, including: an information calculation unit configured to calculate first bandwidth for each subscriber to fairly share total bandwidth set for the transmission of packets between multiple subscribers and is configured to calculate second bandwidth for each flow to fairly share the first bandwidth between one or more flows that belong to each of the multiple subscribers; and a packet scheduling unit configured to schedule a packet of each of the one or more flows based on the second bandwidth.

Other features and aspects may be apparent from the following detailed description, the drawings, and the claims.

BRIEF DESCRIPTION OF THE DRAWINGS

FIG. 4 is a block diagram illustrating an example of a fair bandwidth allocation-based packet scheduling apparatus.

Figure 1:
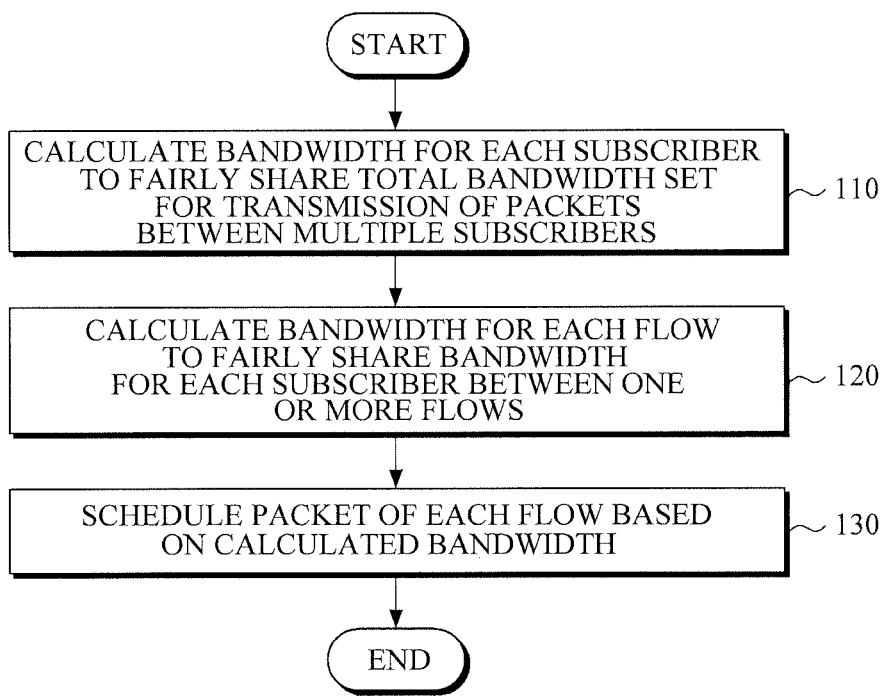
FIG. 1 is a flowchart illustrating an example of a fair bandwidth allocation-based packet scheduling method.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a fair bandwidth allocation-based packet scheduling method.

In the example illustrated in FIG. 1, it is possible to fairly allocate bandwidth between multiple subscribers that attempt to transmit data to the same output port in a network device (such as a router) or between multiple data traffic flows generated by the multiple subscribers.

In the example illustrated in FIG. 1, the term 'subscribers' indicates a group of hosts or servers that share a single output link, and that have the same IP address, or a group of hosts or servers that share the same data packet header combination.

In the example illustrated in FIG. 1, the term 'data traffic flow' or 'flow' indicates a series of packets that can be defined by the same combination of header fields. For example, a series of packets sharing the same source IP address, the same destination IP address, the same protocol value, the same TCP/UDP source port number, and/or the same TCP/UDP destination port number may be defined as a flow. A few header fields may be excluded from or added into consideration when defining a flow. More header fields than the number of header fields that are required to define a subscriber may be used to define a flow.

To perform packet scheduling for multiple flows, a subscriber information storage unit (not shown) that stores subscriber information corresponding to each subscriber and a flow information storage unit (not shown) that stores flow information corresponding to each flow may be used.

The subscriber information storage unit may include a plurality of memory blocks respectively corresponding to a plurality of subscribers. In each of the memory blocks of the subscriber information storage unit, subscriber information, such as bandwidth allocated to each subscriber, the number of flows of each subscriber, and the like, may be stored, maintained, and updated.

The flow information storage unit may include a plurality of memory blocks respectively corresponding to a plurality of flows. In each of the memory blocks of the flow information storage unit, flow information, such as the properties of each flow (for example, forwarding information and scheduling process information of each flow) or any variation in the status of each flow, may be stored, maintained, and updated. For example, each of the memory blocks of the flow information storage unit may store QoS requirement information for providing packet scheduling for each flow, such as QoS type information of each flow, bandwidth allocated to each flow, the priority level of each flow, delay information of each flow, and the like, and status information for performing packet scheduling.

Referring to FIG. 1, in 110, bandwidth for each subscriber may be calculated to fairly share total bandwidth set for the transmission of packets between a plurality of subscribers.

In 120, bandwidth for each flow may be calculated to fairly share the bandwidth for each subscriber between one or more flows that belong to each of the plurality of subscribers. The bandwidth for each subscriber is referred to as first bandwidth, and the bandwidth for each flow is referred to as second bandwidth.

The first bandwidth may be calculated using the following equation:

$$BW_{min}^v = \frac{BW_t}{N}$$

where $BW_{min}^v$ indicates a minimum amount of bandwidth that should be guaranteed for a subscriber v, $BW_t$ indicates total bandwidth that accounts for the bandwidth of an output link of packets excluding some bandwidth available for other purposes of use, and that is set to be fairly distributed between all flows that share the output link, and N indicates the number of subscribers that share the total bandwidth $BW_t$.

In a case in which $\Sigma_{v=1}^{N} BW_{min}^v < BW_t$, i.e., in a case in which, due to some of the N subscribers using traffic less than the minimum bandwidth $BW_{min}^v$, bandwidth currently being used is an arbitrary value $BW_u$ less than the total bandwidth $BW_t$, already-allocated bandwidth may be adjusted such that bandwidth $(BW_t - BW_u)$ currently not being used can be additionally distributed fairly between the N subscribers to improve the efficiency of the use of bandwidth.

Thus, bandwidth $$\frac{BW_t - BW_u}{N}$$

may be additionally allocated to each of the N subscribers. Accordingly, bandwidth $BW_s^v$ actually allocated to each of the N subscribers may be determined by the following equation:

$$BW_s^v = BW_{min}^v + \frac{BW_t - BW_u}{N}.$$

An example of determining a fair amount of bandwidth allocated to an arbitrary flow i that belongs to the subscriber v is described.

For example, minimum bandwidth $BW_{min}^i$ allocated to the arbitrary flow i may be determined by the following equation:

$$BW_{min}^i = \frac{BW_s^v}{N_f^v}$$

where $N_f^v$ indicates a total number of flows that belong to the subscriber v and $BW_s^v$ indicates first bandwidth allocated to the subscriber v. In a case in which, due to some of the $N_f^v$ flows using traffic less than the minimum bandwidth $BW_{min}^v$, bandwidth currently being used is an arbitrary value $BW_u^v$ less than the first bandwidth $BW_s^v$, the bandwidth allocated to each of the $N_f^v$ flows may be adjusted such that bandwidth $(BW_s^v - BW_u^v)$ currently not being used can be additionally distributed fairly between the other flows to improve the efficiency of the use of bandwidth.

In a case in which there are a plurality of subscribers, first bandwidth allocated to one subscriber may be the same as first bandwidth allocated to another subscriber. However, since the number of flows may vary from one subscriber to another subscriber, second bandwidth, which is bandwidth fairly allocated between flows that belong to each of the subscribers, may also vary from one subscriber to another subscriber.

Referring to FIG. 1, in 130, packets of one or more flows that belong to each of the subscribers may be scheduled to be transmitted based on second bandwidth calculated in 120.

An example of allocating a fair amount of bandwidth to each subscriber and each flow is described, assuming that there are three subscribers (i.e., subscribers A, B, and C) sharing a port (i.e., port P) that provides bandwidth BW, and that subscriber A has i flows (i.e., $A_1, A_2, \ldots, A_i$ where i is greater than 1), subscriber B has j flows (i.e., $B_1, B_2, \ldots, B_j$ where j is greater than 1), and subscriber c has k flows $(C_1, C_2, \ldots, C_k$ where k is greater than 1). A, B, and C may indicate IP addresses.

For example, a total of (i+j+k) flows that share port P share the bandwidth BW of port P. In general, the bandwidth BW may be fairly distributed between the (i+j+k) flows without distinguishing one subscriber from another subscriber. In this example, however, the bandwidth BW may be fairly distributed between subscribers, A, B, and C first so that bandwidth BW/3 can be allocated to each of subscribers A, B, and C.

If one of subscribers A, B, and C, for example, subscriber A, fails to use the entire minimum guaranteed bandwidth (i.e., BW/3), bandwidth not being used by subscriber A may be additionally distributed fairly between subscribers B and C. If the amount of bandwidth being used by subscriber A increases up to the minimum guaranteed bandwidth BW/3, subscribers B and C may not be able to use the bandwidth additionally bandwidth allocated thereto. Bandwidth may be fairly allocated between subscribers A, B, and C, and then, the bandwidth allocated to subscriber A, B, or C may be fairly allocated between the i flows, the j flows, or the k flows.

Port P may be a logic port. For example, a physical port may include a plurality of logic ports. For example, the bandwidth BW may not necessarily be maximum bandwidth allocated to port P, and may be bandwidth that can be shared between multiple subscribers. The bandwidth BW may be the maximum bandwidth allocated to port P, excluding bandwidth set for certain purposes, i.e., bandwidth that can be fairly shared between multiple subscribers. Methods to fairly share bandwidth between multiple subscribers and to fairly share bandwidth allocated to each subscriber between multiple flows of a corresponding subscriber may be realized using various algorithms.

Figure 2:
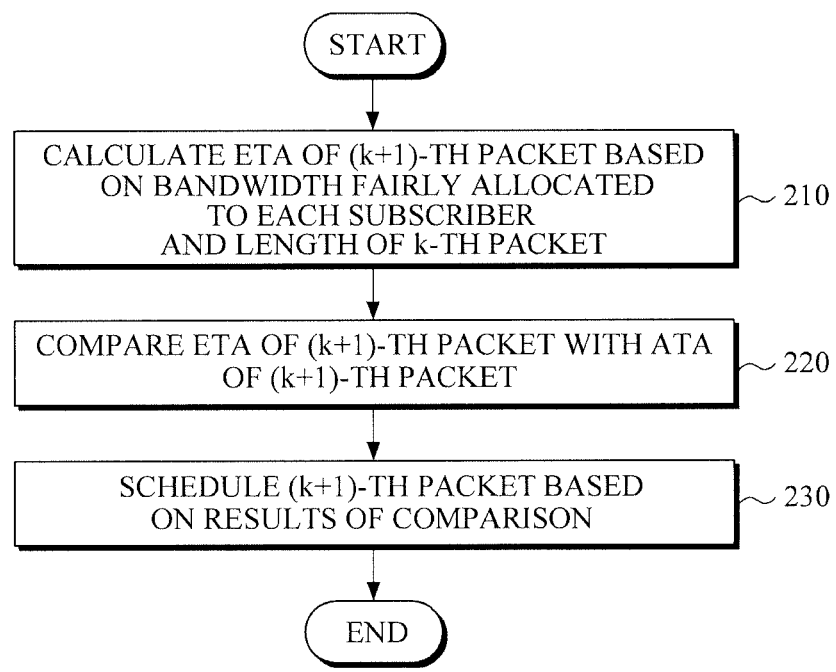
FIG. 2 is a flowchart illustrating an example method of a fair bandwidth allocation-based packet scheduling method.

FIG. 2 illustrates an example of a packet scheduling method.

The example assumes that a currently input packet is a k-th packet and a packet that is input subsequent to the k-th packet is a (k+1)th packet.

Referring to FIG. 2, in 210, to perform packet scheduling, an expected time of arrival (ETA) of a (k+1)-th packet may be calculated based on bandwidth fairly allocated to each flow and the length of a k-th packet of each flow.

In 220, the calculated ETA of the (k+1)-th packet may be compared with an actual time of arrival (denoted as "CUR" in drawings) of the (k+1)-th packet. For example, the calculated ETA of the (k+1)-th packet may be compared with the CUR of the (k+1)-th packet in consideration of burst tolerance BT, which is allowed time for a burst of packets.

In 230, the (k+1)-th packet may be scheduled to be transmitted based on the result of the comparison performed in 220. For example, if the calculated ETA of the (k+1)-th packet is later than a time obtained by adding the burst tolerance BT to the CUR of the (k+1)-th packet (i.e., CUR+BT), the (k+1)-th packet may be discarded.

The example illustrated in FIG. 1 may accompany additional packet processing, and the additional packet processing is further described.

Figure 3A:
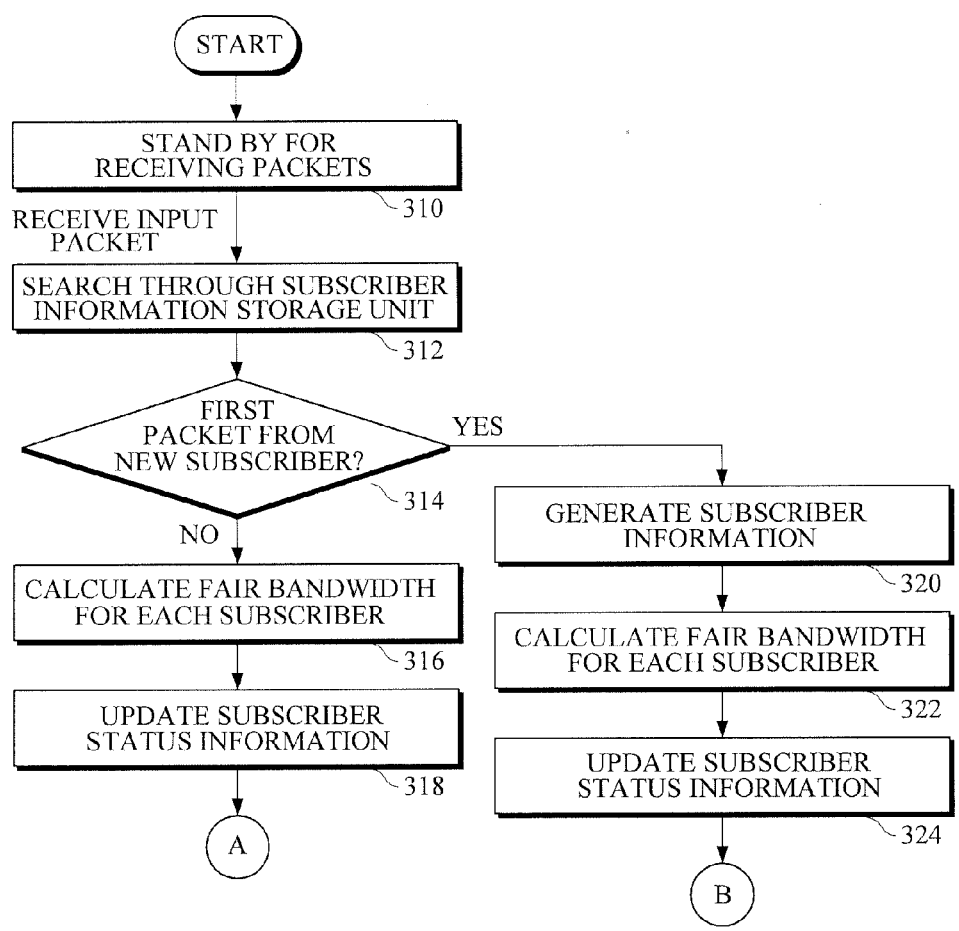
FIGS. 3A through 3C are flowcharts illustrating examples of a fair bandwidth allocation-based packet scheduling method.
Figure 3B:
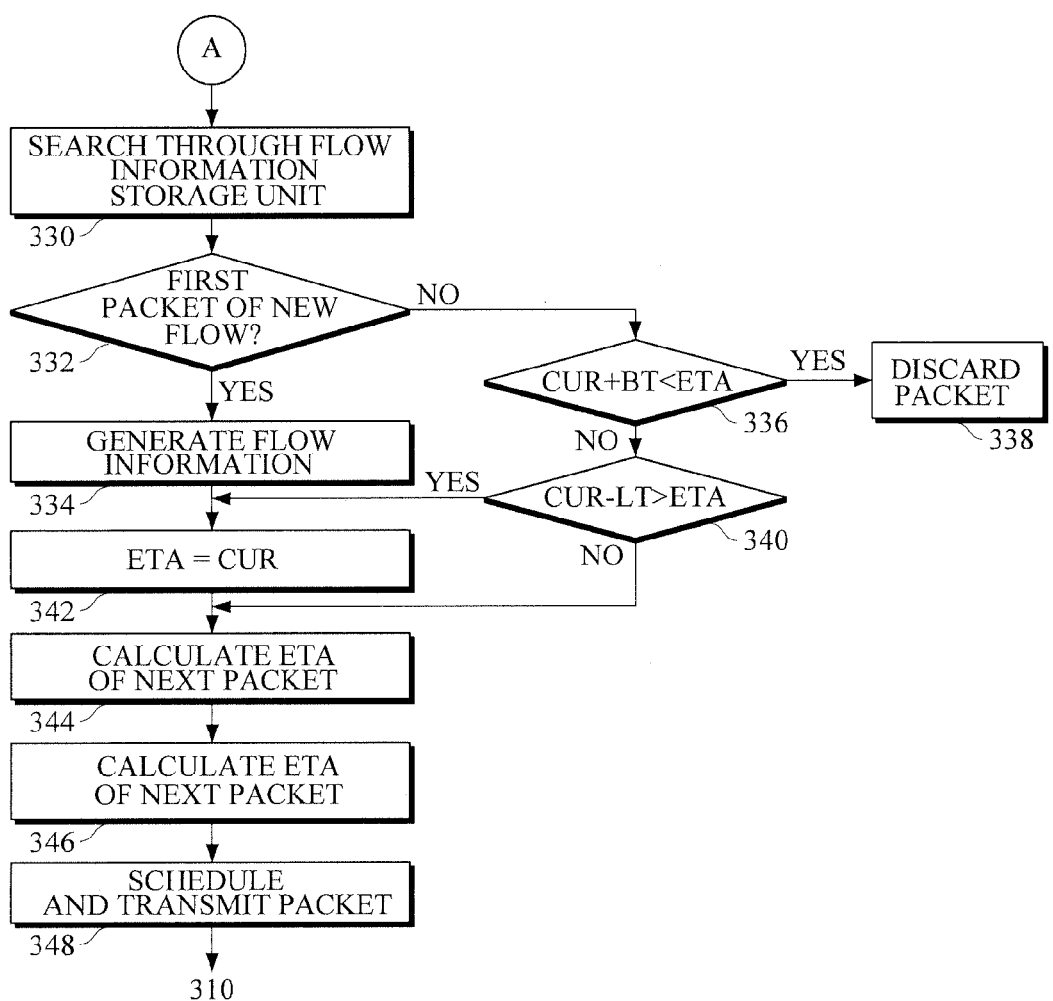
Figure 3C:
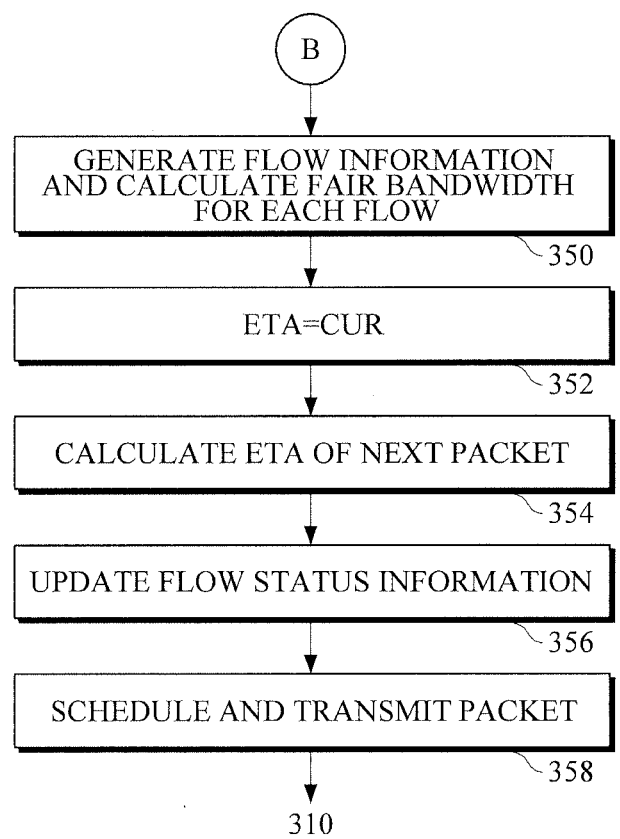

FIGS. 3A through 3C illustrate examples of a fair bandwidth allocation-based packet scheduling method.

Referring to FIG. 3A, in 320, in response to an input packet being received during a packet input standby state in 310, subscriber information corresponding to the input packet is searched for from a subscriber information storage unit (not shown).

In 314, a determination is made as to whether the input packet is a non-first packet from an existing subscriber whose subscriber information is already generated in the subscriber information storage unit or a first packet from a new subscriber whose subscriber information is yet to be generated in the subscriber information storage unit.

In 316, in response to the input packet being a non-first packet from an existing subscriber in 314, first bandwidth to be fairly allocated to each subscriber is calculated based on a total number of subscribers stored in the subscriber information storage unit. In 318, the calculated first bandwidth is stored and updated in the subscriber information storage unit as subscriber status information. Operations 316 and 318 may not necessarily be performed after operation 314, but may be performed after, for example, an operation of a flow information storage unit (not shown). The operation of the flow information storage unit is described with reference to FIG. 3B.

In 320, in response to the input packet being a first packet from a new subscriber in 314, subscriber information corresponding to the new subscriber is generated, and the generated subscriber information is added to the subscriber information storage unit. The total number of subscribers is increased by 1. In 322, the first bandwidth to be fairly allocated to each subscriber is recalculated using the increased total number of subscribers. In 324, the recalculated first bandwidth is stored and updated in the subscriber information storage unit as the subscriber status information.

An example of the processing of a packet from an existing subscriber using first bandwidth fairly allocated to each subscriber is described with reference to FIG. 3B.

Referring to FIG. 3B, in 330, the flow information storage unit is searched through.

In 332, a determination is made as to whether the input packet is a non-first packet of an existing flow whose flow information is already generated in the flow information storage unit or a first packet of a new flow whose flow information is yet to be generated in the flow information storage unit.

For example, the input packet may be a k-th packet, among a plurality of packets of an i-th flow that are sequentially received without any data loss. In this example, an ETA of the k-th packet $ETA_i^k$, which is stored in the flow information storage unit, may be compared with a CUR of the k-th packet. The CUR of the k-th packet may correspond to a system clock time of a packet scheduling apparatus that performs the example illustrated in FIGS. 3A through 3C.

The ETA $ETA_i^k$ may be calculated using Equation (1):

$$ETA_i^k = ETA_i^{k-1} + \frac{L_i^{k-1}}{BW_i} \qquad (1)$$

where $BW_i$ indicates bandwidth fairly allocated to the i-th flow upon the receipt of a (k−1)-th packet, $ETA_i^{k-1}$ indicates an ETA of the (k−1)-th packet, and $L_i^{k-1}$ indicates the length of the (k−1)-th packet.

The expected time of arrival $ETA_i^k$ of the continuous k-th packet of the i-th flow is compared to the sum of the actual time of arrival CUR of the k-th packet and the burst tolerance time (BT) in consideration of burst tolerance or BT. By doing so, it may be determined in 336 whether the k-th packet exceeds BT and is input earlier. The burst tolerance time (BT) may be set to a predetermined value including zero according to the circumstances of a network.

If the expected time of arrival $ETA_i^k$ of the k-th packet is later than the sum (CUR+BT) of the actual time of arrival CUR and the BT in 336, the k-th packet exceeds the BT and thus can be discarded in 338.

If the expected time of arrival $ETA_i^k$ of the k-th packet is equal to or earlier than the sum (CUR+BT) of the actual time of arrival CUR and the BT in 336, the expected time of arrival $ETA_i^k$ of the k-th packet is compared with a time obtained by subtracting a limited time LT for rearranging the ETA (hereinafter, it will be referred to as an ETA limited arrangement time LT) from the actual time of arrival CUR of the k-th packet. According to the comparison result, it is determined whether the k-th packet exceeds the ETA limited "rearrangement time limit" LT and thus the actual time of arrival CUR is delayed than the expected time of arrival $ETA_i^k$ in 340. The ETA "rearrangement limit time" LT may be set according to the circumstances of a network.

If the ETA $ETA_i^k$ of the k-th packet is earlier than a time (CUR−LT) obtained by subtracting the ETA "rearrangement limit time" LT from the actual time of arrival CUR of the k-th packet in 340, it appears that the k-th packet has arrived more than the ETA "rearrangement limit time" LT later than the ETA $ETA_i^k$, and thus the relevant flow of the k-th packet is reset to a current system clock to prevent the difference between the ETA of the flow and the system clock from continuing to increase. For example, the expected time of arrival $ETA_i^k$ of the k-th packet may be initialized to the actual time of arrival CUR of the k-th packet in 342.

In 344, an ETA $ETA_i^{k+1}$ of a (k+1)-th packet of the i-th flow is calculated using Equation (2):

$$ETA_i^{k+1} = ETA_i^k + \frac{L_i^k}{BW_i} \qquad (2)$$

where $L_i^k$, indicates the length of the k-th packet.

In 346, the ETA $ETA_i^{k+1}$ calculated in 344 is stored in the flow information storage unit to update flow status information corresponding to the i-th flow. In 348, the k-th packet is scheduled to be transmitted based on the ETA $ETA_i^k$ that is initialized to the CUR of the k-th packet.

If the expected time of arrival $ETA_i^k$ of the k-th packet is later than or equal to the time obtained by subtracting the ETA "rearrangement limit time" LT from the CUR of the k-th packet in 340, in 344, it appears that the k-th packet has arrived later than the expected time of arrival $ETA_i^k$ but does not exceed the "rearrangement limit time" LT, and the ETA $ETA_i^{k+1}$ is calculated using Equation (2). In 346, the flow status information corresponding to the i-th flow is updated with the ETA $ETA_i^{k+1}$ calculated in 344. In 348, the k-th packet is scheduled to be transmitted based on the ETA $ETA_i^k$.

In 334, in response to the input packet being a first packet of a new flow, e.g., a j-th flow, flow information corresponding to the input packet is generated and is added to the flow information storage unit, and a total number of flows is increased by 1. Bandwidth $BW_j$ allocated to the j-th flow may be calculated. The bandwidth $BW_j$ may be determined by dividing total bandwidth $BW_t$ by a total number N of flows (including the j-th flow) that share an output link. Accordingly, it is possible to fairly share the total bandwidth $BW_t$ between the flows that share an output link.

In 342, an ETA $ETA_j^1$ of the first packet of the j-th flow is initialized to the current system clock that is a packet arrival time CUR ($ETA_j^1$=CUR).

In 344, an ETA $ETA_j^2$ of a second packet of the j-th flow is calculated using Equation (3):

$$ETA_j^2 = ETA_j^1 + \frac{L_j^1}{BW_j} \quad (3)$$

where $L_j^1$ indicates the length of the first packet of the j-th flow.

In 346, the ETA $ETA_j^2$ is updated in a memory block of the flow information storage unit corresponding to the j-th flow. In 348, the first packet of the j-th flow is scheduled to be transmitted based on the ETA $ETA_j^1$ that is initialized. Then, the packet scheduling method returns to 310 of FIG. 3A.

An example of the processing of a first packet from a new subscriber using first bandwidth fairly allocated to each subscriber is described with reference to FIG. 3C.

Referring to FIG. 3C, in 350, in response to the input packet being a first packet from a new subscriber, the input packet is identified as a first packet of a l-th flow, flow information corresponding to the l-th flow is generated and is added to the flow information storage unit, and second bandwidth to be fairly allocated to each flow is calculated. For example, the calculated second bandwidth may be the same as the first bandwidth that is calculated in 324 of FIG. 3A.

In 352, an ETA of the first packet of the l-th flow is initialized to the current system clock CUR.

In 354, an ETA of a second packet of the l-th flow is calculated based on the length of the first packet of the l-th flow and the bandwidth allocated to the l-th flow.

In 356, the ETA of the second packet of the l-th flow is updated in a memory block of the flow information storage unit corresponding to the l-th flow. In 358, the first packet of the l-th flow is scheduled to be transmitted based on the ETA that is initialized to the current system clock CUR in 352. Then, the packet scheduling method returns to 310 of FIG. 3A.

FIG. 4 illustrates an example of a packet scheduling apparatus that performs the packet scheduling method illustrated in FIG. 1.

Referring to FIG. 3, packet scheduling apparatus 400 may include an input processing unit 410, an information storage unit 420, an information calculation unit 430, and a packet scheduling unit 440. The information storage unit 420 may include a subscriber information storage unit 422 and a flow information storage unit 424. The packet scheduling unit apparatus 400 may be implemented as various network devices such as, for example, a router or a Layer 3 (L3) switch. The packet scheduling apparatus 400 may receive packets via an input link 10 and may output scheduled packets via an output link 20.

The input processing unit 410 may receive an input packet, may generate subscriber information corresponding to the input packet, and may store the generated subscriber information in the subscriber information storage unit 422. The input processing unit 410 may generate flow information corresponding to the input packet and may store the generated flow information in the flow information storage unit 424. The input processing unit 410 may search through the subscriber information storage unit 422 and the flow information storage unit 424, and may update and manage the information present in the subscriber information storage unit 422 and the flow information storage unit 424.

The input processing unit 410 may determine whether subscriber information corresponding to the input packet exists in the subscriber information storage unit 422, which stores subscriber information for one or more subscribers. In this example, if a subscriber corresponding to the input packet is a new subscriber yet to be registered in the subscriber information storage unit 422, the input processing unit 410 may generate subscriber information corresponding to the input packet, and may add the generated subscriber information to the subscriber information storage unit 422.

The input processing unit 410 may determine whether flow information corresponding to the input packet exists in the flow information storage unit 424. In this example, if a flow corresponding to the input packet is a new flow yet to be registered in the flow information storage unit 424, the input processing unit 410 may generate flow information corresponding to the input packet, and may add the generated flow information to the flow information storage unit 424.

The subscriber information storage unit 422 may be configured to store, maintain, and update the characteristics of each subscriber, such as the number of flows of each subscriber, second bandwidth fairly allocated to each subscriber, and any variation in the status of each subscriber.

The flow information storage unit 424 may be configured to store, maintain, and update the characteristics of each flow (such as, for example, forwarding information and scheduling processing information) or any variation in the status of each flow. The flow information storage unit 424 may store an ETA of a next packet of each flow that is calculated by the information calculation unit 430.

To fairly share between multiple subscribers total bandwidth set for the transmission of packets by the multiple subscribers, the information calculation unit 430 may calculate first bandwidth for each subscriber. To fairly share the first bandwidth between one or more flows of each subscriber, the information calculation unit 430 may calculate second bandwidth for each flow of each subscriber.

The information calculation unit 430 may calculate an ETA of a (k+1)-th packet of each flow based on bandwidth fairly allocated to each flow and the length of a k-th packet of each flow. For example, the information calculation unit 430 may calculate the ETA of the (k+1)-th packet by adding the result of dividing the length of the k-th packet by bandwidth allocated to each flow to an ETA of the k-th packet.

The information calculation unit 430 may manage bandwidth usage rates of the input and output links 10 and 20. In a case in which there is bandwidth not being used within bandwidth set in the output link 20, the information calculation unit 430 may fairly distribute the bandwidth not being used between all subscribers that share the output link 20. The number of flows that share the output link 20 may correspond to the number of flows stored in and managed by the flow information storage unit 320.

The packet scheduling unit 440 may compare an ETA of a current packet of each flow with a CUR of the current packet, and may schedule a subsequent packet of each flow based on the result of the comparison. For example, in response to the (k+1)-th packet being received, the packet scheduling unit 440 may compare the ETA of the (k+1)-th packet with a CUR of the (k+1)-th packet, and may schedule the (k+1)-th packet based on the result of the comparison. The packet scheduling unit 440 may include a scheduling input unit 442, a packet pointer buffer 444, and a scheduling output unit 446.

The scheduling input unit 442 may allocate one or more packets to the packet pointer buffer 444 according to their ETA. For example, the scheduling unit 442 may allocate one or more packets to a plurality of time slots in the packet pointer buffer 444 allocated according to their ETA.

In response to the k-th packet not being a first packet of its flow, the scheduling input unit 442 may compare the ETA of the (k+1)-th packet with a first time obtained by adding burst tolerance BT to the CUR of the (k+1)-th packet. In response to the ETA of the (k+1)-th packet being later than the first time, the scheduling input unit 442 may discard the (k+1)-th packet.

In response to the ETA of the (k+1)-th packet not being later than the first time, the scheduling input unit 442, the scheduling input unit 442 may compare the ETA of the (k+1)-th packet with a second time obtained by subtracting ETA "rearrangement limit time" LT from the CUR of the (k+1)-th packet.

In response to the ETA of the (k+1)-th packet being earlier than the second time, the scheduling input unit 442 may initialize the ETA of the (k+1)-th packet to the CUR of the (k+1)-th packet. In response to the ETA of the (k+1)-th packet not being earlier than the second time, the scheduling input unit 442 may calculate an ETA of a (k+2)-th packet based on the ETA of the (k+1)-th packet.

The packet pointer buffer 444 may include a plurality of time slots that can be allocated according to an ETA of each packet. The packet pointer buffer 444 may be implemented as a circular queue whose beginning and end are connected.

The packet pointer buffer 444 may have various sizes according to its memory capacity. The packet pointer buffer 444 is illustrated in FIG. 4 as having 16,384 time slots. Each time slot of the packet pointer buffer 444 may have various sizes according to its memory capacity. For example, a time slot may be generated in the packet pointer buffer 444 at intervals of 8 microseconds. In this example, the scheduling input unit 442 may allocate one or more packets to the packet pointer buffer 444 according to their ETA at intervals of 8 microseconds.

The scheduling output unit 446 may process packets allocated to the packet pointer buffer 444 according to the bandwidth of the output link 20, and may transmit the processed packets to the output link 20.

The packet scheduling apparatus 400 may be configured to perform an example of a packet scheduling method, and may also included various function blocks other than those set forth herein.

As described above, it is possible to fairly share network bandwidth between subscribers and fairly share network bandwidth allocated to each subscriber between flows. In addition, it is possible to effectively control unresponsive traffic, which is traffic that does not respond to congestion of traffic in a network, and fairly share bandwidth between flows by determining fair bandwidth for each flow and scheduling packets based on the determined bandwidth. Moreover, unlike in weighted fair queuing (WFQ), it is possible to effectively perform packet scheduling without requiring virtual time information and an array structure based on a time stamp that is calculated based on virtual time information, and that is allocated to each packet. Furthermore, unlike in frame-based scheduling, it is possible to effectively perform packet scheduling without requiring frame size adjustment and frame synchronization.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A packet scheduling method, comprising:
    calculating first bandwidth for each subscriber to fairly share total bandwidth set for the transmission of packets between multiple subscribers;
    calculating second bandwidth for each flow to fairly share the first bandwidth between one or more flows that belong to each of the multiple subscribers;
    scheduling a packet of each of the one or more flows based on the second bandwidth;
    fairly distributing the bandwidth not being used between the multiple subscribers in response to there being bandwidth not being used within the total bandwidth; and
    fairly distributing the bandwidth not being used between one or more flows that share the second bandwidth in response to in there being bandwidth not being used within the second bandwidth, wherein the scheduling comprises:
calculating an estimated time of arrival (ETA) of a (k+1)-th packet based on the second bandwidth and a length of a current k-th packet;
comparing an actual time of arrival of the (k+1)-th packet with the ETA of the (k+1)-th packet in response to the (k+1)-th packet being received; and
scheduling the (k+1)-th packet based on the results of the comparing,
wherein the comparing comprises:
comparing the ETA of the (k+1)-th packet with a first time that is obtained by adding the actual time of arrival of the (k+1)-th packet and burst tolerance, which is allowed time for a burst of packets; and
discarding the (k+1)-th packet in response to the ETA of the (k+1)-th packet being later than the first time,
wherein the scheduling comprises:
discarding the (k+1)-th packet in response to the ETA of the (k+1)-th packet being later than the first time; and
comparing the ETA of the (k+1)-th packet with a second time that is obtained by subtracting a "rearrangement limit time" for the expected time of arrival from the actual time of arrival of the (k+1)-th packet in response to the ETA of the (k+1)-th packet not being later than the first time.

2. The packet scheduling method of claim 1, wherein the scheduling further comprises:
in response to the ETA of the (k+1)-th packet being earlier than the second time, initializing the ETA of the (k+1)-th packet to the actual time of arrival of the (k+1)-th packet; and
in response to the ETA of the (k+1)-th packet not being earlier than the second time, calculating an ETA of a (k+2)-th packet based on the ETA of the (k+1)-th packet.

3. A packet scheduling apparatus, comprising:
an information calculation unit configured to calculate first bandwidth for each subscriber to fairly share total bandwidth set for the transmission of packets between multiple subscribers and configured to calculate second bandwidth for each flow to fairly share the first bandwidth between one or more flows that belong to each of the multiple subscribers;
a packet scheduling unit configured to schedule a packet of each of the one or more flows based on the second bandwidth;
a subscriber information storage unit configured to store subscriber information for at least one subscriber; and
a flow information storage unit configured to store flow information for at least one flow, including the ETA of the (k+1)-th packet,
wherein the information calculation unit is further configured to calculate an estimated time of arrival (ETA) of a (k+1)-th packet based on the second bandwidth and a length of a current k-th packet, and the packet scheduling unit is further configured to, in response to the (k+1)-th packet being received, compare an actual time of arrival of the (k+1)-th packet with the ETA of the (k+1)-th packet and schedule the (k+1)-th packet based on the results of the comparison,
wherein the packet scheduling unit comprises:
a packet pointer buffer configured to include a plurality of time slots that are allocated according to an ETA of each packet;
a scheduling input unit configured to allocate one or more packets to the plurality of time slots; and
a scheduling output unit configured to transmit the one or more packets allocated to the packet pointer buffer.

4. The packet scheduling apparatus of claim 3, wherein the scheduling input unit is further configured to, in response to the k-th packet not being a first packet of its flow, compare the ETA of the (k+1)-th packet with a first time that is obtained by adding the actual time of arrival of the (k+1)-th packet and burst tolerance, which is allowed time for a burst of packets, and further configured to, in response to the ETA of the (k+1)-th packet being later than the first time, discard the (k+1)-th packet.

5. The packet scheduling apparatus of claim 4, wherein the scheduling input unit is further configured to, in response to the ETA of the (k+1)-th packet not being later than the first time, compare the ETA of the (k+1)-th packet with a second time that is obtained by subtracting a "rearrangement limit time" for the expected time of arrival from the actual time of arrival of the (k+1)-th packet.

6. The packet scheduling apparatus of claim 5, wherein the scheduling input unit is further configured to, in response to the ETA of the (k+1)-th packet being earlier than the second time, initialize the ETA of the (k+1)-th packet to the actual time of arrival of the (k+1)-th packet and further configured to, in response to the ETA of the (k+1)-th packet not being earlier than the second time, calculate an ETA of a (k+2)-th packet based on the ETA of the (k+1)-th packet.

7. The packet scheduling apparatus of claim 3, wherein the packet pointer buffer is further configured to be a circular queue whose beginning and end are connected.

8. The packet scheduling apparatus of claim 3, wherein the information calculation unit is further configured to, in response to there being bandwidth not being used within the total bandwidth, fairly distribute the bandwidth not being used between the multiple subscribers and further configured to, in response to in there being bandwidth not being used within the second bandwidth, fairly distribute the bandwidth not being used between one or more flows that share the second bandwidth.

* * * * *